United States Patent

Oishi et al.

[11] 3,890,433
[45] June 17, 1975

[54] METHOD FOR MANUFACTURING PHARMACEUTICAL PREPARATION

[76] Inventors: Ryota Oishi, Yamato 1-chome, Takatsuki-shi; Yotaka Mito, Otoshimoto-cho, Neyagawa-shi; Kenji Yamauchi, Kuwata-cho, Ibaraki-shi; Katsuyuki Takahashi, Sonehigashi-machi, Touonaka-shi; Kazushi Hirata, Ooike 2-chome, Ibaraki-shi, all of Japan

[22] Filed: Oct. 4, 1972

[21] Appl. No.: 294,949

[30] Foreign Application Priority Data
Oct. 4, 1971    Japan............................ 46-78058

[52] U.S. Cl.................................. 424/37; 424/320
[51] Int. Cl............................................ A61k 9/00
[58] Field of Search............................ 424/37, 320

[56] References Cited
UNITED STATES PATENTS

| | | | |
|---|---|---|---|
| 2,756,177 | 7/1956 | Cannalonga et al. | 424/284 |
| 2,897,119 | 7/1959 | Dunn | 424/284 |
| 3,067,104 | 12/1962 | Hochberg et al. | 424/237 |
| 3,137,630 | 6/1964 | Hecker et al. | 424/284 |
| 3,184,385 | 5/1965 | Anderson | 424/284 |
| 3,207,666 | 9/1965 | Houtgraf et al. | 424/284 |
| 3,445,563 | 5/1969 | Clegg et al. | 424/237 |
| 3,597,458 | 8/1971 | Nakamura et al. | 424/320 |

*Primary Examiner*—Shep K. Rose

[57] ABSTRACT

A method for manufacturing a pharmaceutical preparation which comprises melting an amide compound of the formula:

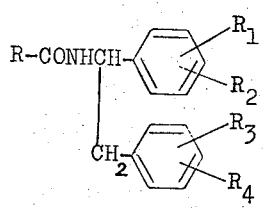

wherein R is a straight or branched, saturated or unsaturated hydrocarbon group having 17 to 25 carbon atoms substituted or not with hydroxyl and $R_1$, $R_2$, $R_3$ and $R_4$ are each a hydrogen atom, a haolgen atom, a lower alkyl group or a lower alkoxy group but all of them are not simultaneously hydrogen atoms in the form of a paste or wax-like solid at an ordinary temperature in the presence of oil-soluble anti-oxidizing agents, emulsifying the resulting melted mixture with a gellating agent in the presence of water-soluble antioxidizing agents and saccharides and/or sugar alcohols, spraying the resultant emulsion onto fine particles of a water-absorptive material and separating the gelled fine beads of the amide compound from the fine particles of the water-absorptive material, followed by drying. The thus manufactured preparation of the amide compound is highly stable to air oxidation, easily administrable through an intestinal route and exhibits a highly pharmacological activity.

16 Claims, No Drawings

METHOD FOR MANUFACTURING PHARMACEUTICAL PREPARATION

The present invention relates to a method for manufacturing a pharmaceutical preparation. More particularly, it relates to a method for manufacturing pharmaceutical preparation of an amide compound of the formula:

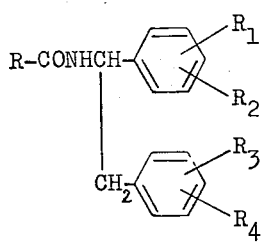

[I]

wherein R is a straight or branched, saturated or unsaturated hydrocarbon group having 17 to 25 carbon atoms substituted or not with hydroxyl and $R_1$, $R_2$, $R_3$ and $R_4$ are each a hydrogen atom a halogen atom (e.g. chlorine, bromine, iodine, fluorine), a lower alkyl group (e.g. methyl, ethyl, propyl, isopropyl, butyl) or a lower alkoxy group (e.g. methoxy, ethoxy, propoxy, isopropoxy, butoxy) but all of them are not simultaneously hydrogen atoms, which is highly stable to oxygen, easily administrable through an intestinal route and exhibits a high pharmacological activity.

Throughout the specification, the term "lower" is intended to mean 1 to 8 carbon atoms, preferably 1 to 4 carbon atoms.

The said amide compounds [I] are known to be useful as anti-arteriosclerotic agents which lower remarkably the amount of cholesterol in the blood and liver, and excellently prevent atherosclerosis without exerting any unfavorable side effect even after their administration for a long duration [cf. U.S. Pat. No. 3,597,458]. Almost all of them are easily oxidized with air and have a high melting point and form a paste or wax-like solid at an ordinary temperature (e.g. 15 to 25°C). Since it is difficult to pulverize them due to their paste or wax-like property, the formulation of said compounds into a pharmaceutical preparation readily and conveniently administrable is hardly accomplished by conventional procedures. Even if pulverized by any mechanical procedure, they are readily oxidized with air because of the increase of their surface area.

For formulating a paste or wax-like material into a pharmaceutical preparation, there has been known a procedure which comprises dissolving such material in an organic solvent, spraying the resulting solution onto an absorptive material and then evaporating the organic solvent therefrom. There has also been known a procedure which comprises melting the paste or wax-like material, dropping the resultant melt into an insoluble solvent and separating the solidified drops therefrom. The application of these procedures to the amide compound [I], however, can not afford a pharmaceutical preparation improved in its stability to oxygen in the air and excellent in its dispersibility in digestive organs.

Although a procedure which comprises dissolving the amide compound [I] into an organic solvent and formulating the resultant solution into a soft gelatin capsule overcomes such defects, it is accompanied by drawbacks such as the solidification of the amide compound [I] and the toxicity of the organic solvent employed.

As the result of extensive studies, there has now been provided an advantageous method for manufacturing a pharmaceutical preparation of the amide compound [I], which is highly stable to oxygen, is readily administrable through an intestinal route and exhibits a high pharmacological activity.

According to the present invention, the amide compound [I] in the form of a paste or wax-like solid at an ordinary temperature is melted in the presence of a small amount of oil soluble anti-oxidizing agents, the melted mixture is admixed with another necessary amount of oil-soluble anti-oxidizing agents, the resulting melted mixture is emulsified in water with a gellating agent in the presence of water-soluble antioxidizing agents with or without saccharides and/or sugar alcohols, the resultant emulsion is sprayed onto fine particles of a water absorptive material and the gelled beads of the amide compound [I] are separated from the fine particles of the water absorptive material, followed by drying.

In U.S. Pat. No. 2,756,177, there is disclosed a method for manufacturing a pharmaceutical preparation of vitamin-active compounds. This method is, however, not applicable to substances which are solid at an ordinary temperature such as the amide compound [I]. That is, the starting compound is required to be melt liquefied at a temperature higher than its melting point so as to prepare a uniform, stable emulsion, during which the oxidation of the compound proceeds. In such case, an oil-soluble anti-oxidizing agent is usually added, but the heat decomposition of the anti-oxidizing agent is caused at the same time so that it must be used in a large amount.

According to the method of the present invention, by executing the melting of the amide compound [I] in the presence of a small amount of anti-oxidizing agents, with the subsequent addition of a necessary amount thereof, the oxidation during the melting can be prevented and the amount of the anti-oxidizing agents to be used can be reduced. Further, the combined use of oil-soluble anti-oxidizing agents and water soluble antioxidizing agents produces a greatly increased antioxidizing effect.

Moreover, an important difference between the said known method and the present method is based on the high melting point of the amide compounds [I]. That is, a substance which is an oily liquid at an ordinary temperature such as vitamins A, D or E can be converted into stable fine particles in a gelled state by gelatinization with only a gellating substance such as gelatin according to the said known method. However, in case of an emulsion of a substance having a high melting point such as the amide compounds [I], solidification occurs at a temperature higher than the gellating temperature of the gellating agent such as gelatin, prior to the formation of a gel film, so that the inner structure of the produced beads in a gel state is not uniform, and the desirable stability can not be obtained.

The advantageous feature of the method of this invention is that the content of the amide compound [I] in the produced particles can be increased to 50 percent by weight or more, usually 30 to 60 percent by weight, while in case of the said known method the content of the active compound reaches only about 15 to 30 percent by weight.

On carrying out the method of this invention, a mixture comprising a water-soluble protein which is gelled at an ordinary temperature such as gelatin (0.3 to 0.8 part by weight) and one or more saccharides such as sucrose, glucose and fructose and/or sugar alcohols such as sorbitol and mannitol (0.2 to 0.7 part by weight) is dissolved in purified water (1.5 3 parts by weight) under heating, and one or more water-soluble anti-oxidizing agents such as erythorbic acid, ascorbic acid, citric acid and their sodium salts and sodium hydrogensulfite (each 0.001 to 0.03 part by weight) are added thereto and dissolved. The resultant mixture is kept at 60 to 80°C. Separately, the amide compound [I] (1 part by weight) is melted at a temperature higher than its melting point in the presence of one or more oil-soluble anti-oxidizing agents such as tocopherol and stearyl ascorbate (each 0.002 to 0.005 part by weight), and the said oil-soluble anti-oxidizing agent(s) (each 0.01 to 0.03 part by weight), if necessary together with an anti-oxidizing agent such as butylhydroxyanisole or butylhydroxytoluene (0.001 to 0.003 part by weight), are newly added thereto and melted. The resulting liquid is immediately added to the above obtained aqueous solution, and the mixture is stirred by the aid of an appropriate stirrer, a dispersing machine or an emulsifying machine, if necessary under a stream of nitrogen, to prepare a uniform, stable emulsion, which is adjusted to a suitable viscosity for a desired particle size of objective beads with hot purified water. The viscosity of the emulsion is usually from 250 to 750 c.p.s. at 70°C, preferably from 300 to 500 c.p.s. at 70°C. The thus obtained emulsion is sprayed into an upper part of a chamber which contains a water absorptive material in fine powder from (15 to 25 parts by weight) at the bottom.

For increasing the size of the beads to be produced in a gel state, the use of a spraying apparatus of nozzle type is preferred to that a centrifugal rotating plate type. Further, in the apparatus of nozzle type, the airless style is favorable.

The spraying temperature is desirably as low as possible so long as the solidification of the amide compound [I] does not occur and may be usually from 60 80°C.

The sprayed fine drops of the emulsion fall downward onto the water-absorptive material present as a fine powder at the bottom of the chamber while being gelled and are dehydrated by contacting with the water-absorptive material, whereby the gellation is completed and secondary coagulation can be prevented.

As to the water absorptive material in fine powder, a detailed description is given in British Pat. No. 1,142,147, but in the present invention, there is no particular limitation, provided that it meets the usual requisites such as being inert, being insoluble in water and having a particle size of not more than 74 $\mu$ (200 mesh sieve of the U.S.A. standard). Preferable examples of the water absorptive material include starch, processed starch, talc, aluminium hydroxy gel, etc. They may be used alone or in mixture. The amount of the water-absorptive material to be used is normally 8 parts by weight or more to 1 part by weight of the water in the emulsion.

It is preferred to fluidize the water absorptive material in into a fine powder by blowing the air from the lower and side parts of the chamber so as to enhance the efficiency of action.

The beads in a gel state are separated from the finely produced water-absorptive material by a conventional screening method and dried in a usual manner to adjust the water content to 2 to 8 percent by weight, preferably 3 to 5 percent by weight.

According to the invention, the amide compound [I] is dispersed as fine particles of 1 to 5 $\mu$ in particle size in a gellating material such as gelatin to be coated and protected so that its stability to air oxidation is greatly increased. For example, when the amide compound [I] is finely crushed, charged into hard capsules and stored in a thermostat at 50°C for 1 month, the peroxide value determined according to the method described in Japanese Pharmacopoeia exceeds 100. On the contrary, the beads of the amide compound [I] obtained according to the invention reveal the peroxide value of only about 10 after being stored under the same condition as above, and even after 3 months, the value does not increase.

The beads of the invention can be, when taken, readily dispersed as fine particles of 1 to 5 $\mu$ in particle size in intestinal organs so that a high pharmacologocal activity is exerted.

Table 1 shows the cholesterol value in serum and liver of mice determined after they are fed for 10 days with a diet containing cholesterol and the amide compound [I] which is absorbed therein as micro fine particles by spraying its etheral solution or admixed therewith in bead form prepared according to the method of the invention. It is apparent that the drop of cholesterol values in serum and liver after administration of both of the above preparative methods are almost equal. That is, beads of the amide compound [I] prepared according to the method of the invention reveal the same pharmacological activity as in the case where the compound is applied as micro fine particles obtained by spraying an etheral solution.

Table 1

| Test group | Amount of amide compound (% in diet) | Number of living mice | Number of test mice | Increase of weight (g/10 days) | Final weight (g) | Serum cholesterol Amount (mg/100 ml) | Cholesterol lowering effect (%) |
| --- | --- | --- | --- | --- | --- | --- | --- |
| Control A | | | 10/10 | 7.57 | 19.3 | 343 | (372)* |
| Control B | | | 10/10 | 5.06 | 18.3 | 401 | |
| Group fed with diet containing amide compound absorbed therein by spraying its etheral solution | 0.0125 | | 10/10 | 5.87 | 17.9 | 247 | −33** |
| | 0.05 | | 10/10 | 3.48 | 15.2 | 263 | −29 |
| | 0.2 | | 10/10 | 3.54 | 14.8 | 209 | −44 |
| Group fed with | 0.0125 | | 10/10 | 4.48 | 14.8 | 264 | −29 |

Table 1 — Continued

| Test group | Amount of amide compound (% in diet) | Number of living mice | Number of test mice | Increase of weight (g/10 days) | Final weight (g) | Serum cholesterol Amount (mg/100 ml) | Serum cholesterol Cholesterol lowering effect (%) |
|---|---|---|---|---|---|---|---|
| diet admixed with fine granules of amide compound prepared by present invention | 0.05 | 10/10 | | 4.36 | 16.1 | 287 | −23 |
| | 0.2 | 10/10 | | 3.21 | 14.6 | 219 | −41 |

| Test group | Liver cholesterol Amount (mg/100 g) | Liver cholesterol Cholesterol lowering effect (%) | Cholesterol pool in serum and liver Amount (mg/100 g B.W.) | Cholesterol pool in serum and liver Cholesterol lowering effect (%) |
|---|---|---|---|---|
| Control A | 2620 | | 229 | |
| Control B | 2785 | (2700)* | 243 | (236)* |
| Group fed with diet containing amide compound absorbed therein by spraying its etheral solution | 1110 | −59** | 89.5 | −62** |
| | 653 | −76 | 50.9 | −78 |
| | 485 | −82 | 42.4 | −82 |
| Group fed with diet admixed with fine granules of amide compound prepared by present invention | 1270 | −53 | 100.5 | −58 |
| | 821 | −70 | 63.0 | −73 |
| | 617 | −77 | 48.3 | −80 |

Remarks: * Average of Controls A and B.
** Cholesterol lowering effect =
Treated value - Control value/Control value × 100 (%)

Further, according to the method of the invention, the particle size of the beads can be variously changed in the range of from 100 to 1000 $\mu$ by adjusting the viscosity of the emulsion, the spraying rate of the emulsion and the like, so that the beads may be taken as such as a medicinal preparation or charged in hard capsules, and as the case may be they can be tableted.

To summarize the above descriptions, the amide compounds [I] can be advantageously converted to a preparation form to be easily taken as medicines showing a high pharmacological activity which are stable to air oxidation in accordance with the present invention.

The invention will be better understood from the following examples which are given for illustration purpose only and are not meant to limit the invention, wherein percent is by weight.

EXAMPLE 1

A mixture of the amide compound of the formula:

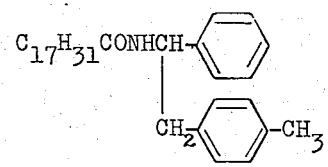

(1 kg), stearyl ascorbate (3 g) and dl-α-tocopherol (3 g) is melted on an oil bath at 110° to 120°C. Then, stearyl ascorbate (10 g) and dl-α-tocopherol (10 g) are added thereto and melted quickly. Separately, a mixture of gelatin (700 g), sucrose (300 g) and erythorbic acid (20 g) is dissolved in purified water (2.1 litre) at 70° to 80°C in a water bath. The resultant solution is stirred by the aid of a homomixer at a rate of about 8,000 to 10,000 rpm, and the above obtained melt is added thereto. The mixture is stirred at 70° to 85°C for about 1 hour, whereby a uniform emulsion having a viscosity of about 300 cps at 70°C is obtained. The emulsion is, while maintained at 70 to 80°C, sprayed into a cylindrical chamber of 2 m in height and 0.8 m in diameter from the top portion through a nozzle of 1.0 mm in diameter under a pressure of about 40 kg/cm². In the chamber, there is previously charged at the bottom a uniform mixture of dry cornstarch (18 kg) and talc (2 kg) in fine powder form which is fluidized by blowing air of ordinary temperature (e.g. 15° to 25°C) therein from the lower and side parts. After spraying, the resultant mixture is screened to 150 mesh, and the obtained beads in a gelled state are dried by a fluidized-bed dryer at 25° to 35°C for about 1 hour to give light brown beads (2.2 kg) containing the said amide compound in a concentration of 400 to 420 mg/g. The water content is 4.8 percent. About 70 percent of the beads have a particle size of from 150 to 400 $\mu$. They show a peroxide value of 11 after being stored in hard capsules at 50°C for 1 to 2 months, and 97% of them are finely dispersed in an artificial intestinal juice prepared according to the British Pharmacopoeia.

EXAMPLE 2

As in Example 1, an emulsion is prepared using the following materials:

| | | |
|---|---|---|
| The amide compound | 1 | kg |
| Stearyl ascorbate | 13 | g |
| dl-α-Tocopherol | 13 | g |
| Gelatin | 500 | g |
| Glucose | 500 | g |
| Erythorbic acid | 20 | g |
| Sodium hydrogensulfite | 1 | g |
| Purified water | 1.8 | litres |

From the emulsion, beads in a gelled state (2.3 kg) are obtained as in Example 1. The concentration of the amide compound and the water content are 380 to 400 mg/g and 3.8%, respectively. The peroxide values determined after storage under the same condition as in Example for 1 and 2 months are 9 and 14, respectively. About 98 percent of the beads are completely dispersed in the artificial intestinal juice.

EXAMPLE 3

As in Example 1, an emulsion is prepared using the following materials:

| The amide compound | 1 | kg |
| --- | --- | --- |
| Stearyl ascorbate | 13 | g |
| dl-α-Tocopherol | 13 | g |
| Butylhydroxytoluene | 1 | g |
| Gelatin | 500 | g |
| Sucrose | 500 | g |
| Erythorbic acid | 20 | g |
| Purified water | 1.8 | litres |

From the emulsion, beads in a gelled state (2.2 kg) are obtained as in Example 1. The concentration of the amide compound and the water content are 400 to 420 mg/g and 4.4 percent, respectively. The peroxide values determined after storage under the same condition as in Example 1 for 1 and 2 months are 10 and 12, respectively. About 99 percent of the beads are completely dispersed in the artificial intestinal juice.

EXAMPLE 4

As in Example 1, an emulsion is prepared using the following materials:

| The amide compound | 10 | kg |
| --- | --- | --- |
| Stearyl ascorbate | 130 | g |
| dl-α-Tocopherol | 130 | g |
| Butylhydroxytoluene | 10 | g |
| Gelatin | 7 | kg |
| Sucrose | 3 | kg |
| Erythorbic acid | 200 | g |
| Sodium hydrogensulfite | 10 | g |
| Purified water | 17 | litres |

The emulsion (viscosity: 500 cps at 70°C) is sprayed into a cylindrical chamber of 4 m in height and 1 m in diameter from the top portion through a nozzle of 0.8 mm in diameter under a pressure of 70 kg/cm². In the chamber, there is previously charged at the bottom a uniform mixture of dry cornstarch (150 kg), talc (18 kg) and aerosil (2 kg) in fine form powder, which is fluidized by blowing air of ordinary temperature (e.g. 15 to 25°C) therein from the lower part. After spraying, the resultant mixture is treated as in Example 1 to give beads in a gelled state, of which about 70 percent have a particle size of from 250 to 500 μ or about 50 percent have a particle size of from 350 to 700 μ.

What we claim is:

1. A method for manufacturing a pharmaceutical preparation of an amide compound of the following formula:

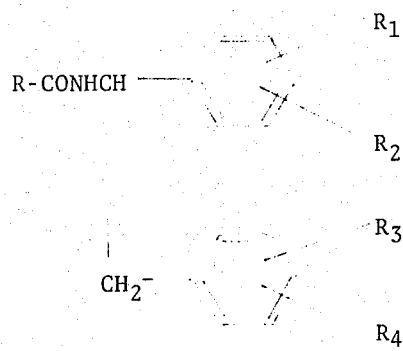

wherein R is a straight or branched, saturated or unsaturated hydrocarbon group having 17 to 25 carbon atoms, unsubstituted or substituted with hydroxyl, and wherein $R_1$, $R_2$, $R_3$ and $R_4$ are each a hydrogen atom, a halogen atom, a lower alkyl group or a lower alkoxy group, provided that $R_1$, $R_2$, $R_3$ and $R_4$ are not simultaneously all hydrogen atoms, said amide being either a paste, a semisolid or a wax-like solid with a melting point of from 50°C. to 84.5°C. at ambient temperature, the resulting preparation being highly stable to air oxidation, easily administrable through an intestinal route and exhibiting a high pharmacological activity, which comprises the steps of:

1. melting said amide compound at 110°C. to 120°C. in the presence of about 0.2 to 0.5 percent by weight, on the basis of the amount of amide compound, of at least one oil-soluble antioxidizing agent;
2. adding to and melting into the melted mixture maintained at said temperature of 110°C. to 120°C. about 1.0 to 3.0 percent by weight, on the basis of the amount of amide compound, of at least one of said oil-soluble anti-oxidizing agents;
3. dispersing the resulting melted mixture in an aqueous solution of a gellating agent and about 0.1 to 3.0 percent by weight, on the basis of the amount of amide compound, of at least one water-soluble anti-oxidizing agent by stirring said mixture at 70°C. to 85°C. until a uniform emulsion is obtained;
4. spraying the resultant emulsion, while maintained at a temperature of from 70° to 80°C., onto fine particles of a water-absorptive material which is inert and insoluble in water and has a particle size of not more than 74 microns;
5. separating the gelled beads from the fine particles of water-absorptive material, and;
6. drying the gelled beads.

2. The method according to claim 1, wherein the melted mixture is dispersed in step (3) in an aqueous solution of a gellating agent, about 0.1 to 3.0 percent by weight, on the basis of the amount of amide compound, of at least one water-soluble anti oxidizing agent and at least one saccharide or sugar alcohol.

3. The method according to claim 1, wherein the content of the amide compound in the produced beads is 30 to 60 percent by weight.

4. The method according to claim 1, wherein the oil-soluble anti-oxidizing agent is selected from the group consisting of tocopherol, stearyl ascorbate, butylhydroxyanisole and butylhydroxytoluene.

5. The method according to claim 1, wherein the water-soluble anti-oxidizing agent is selected from the group consisting of erythorbic acid, ascorbic acid, citric acid, the sodium salts thereof and sodium hydrogen sulfite.

6. The method according to claim 1, wherein the viscosity of the emulsion is 250 to 750 cps at 70°C.

7. The method according to claim 1, wherein the spraying is effected at a temperature of 60 to 80°C.

8. The method according to claim 1 wherein the weight ratio of the water absorptive material to the water in the emulsion is not less than 8.

9. The method according to claim 1, wherein the particle size of the produced beads is from 100 to 1000 μ.

10. The method according to claim 1, wherein the amount of gellating agent is about 30 to 80 percent by weight, on the basis of the amount of amide compound.

11. The method according to claim 1, wherein said water-absorptive material is selected from the group consisting of starch, talc and aluminum hydroxy gel.

12. The method according to claim 11, wherein the amount of water-absorptive material is 8 parts by weight or more to 1 part by weight of the water in the emulsion.

13. The method according to claim 2, wherein the amount of saccharide or sugar alcohol is about 20 to 70 percent by weight, on the basis of the amount of amide compound.

14. A method for manufacturing a pharmaceutical preparation of an amide compound of the formula:

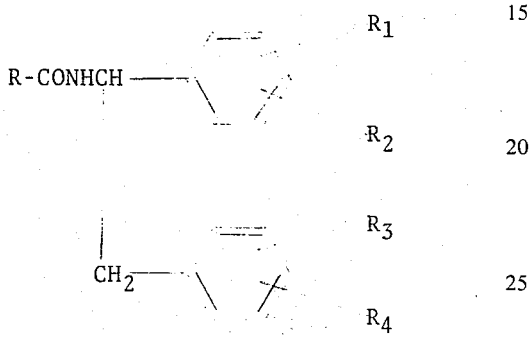

wherein R is a straight or branched, saturated or unsaturated hydrocarbon group having 17 to 25 carbon atoms, unsubstituted or substituted with hydroxyl, and wherein $R_1$, $R_2$, $R_3$ and $R_4$ are each a hydrogen atom, a halogen atom, a lower alkyl group or a lower alkoxy group, provided that $R_1$, $R_2$, $R_3$ and $R_4$ are not simultaneously all hydrogen atoms, said amide being either a paste, a semisolid or a wax-like solid with a melting point of from 50°C. to 84.5°C. at ambient temperature, the resulting preparation being highly stable to air oxidation, easily administrable through an intestinal route and exhibiting a high pharmacological activity which comprises the steps of;

1. melting said amide compound at 110°C. to 120°C. in the presence of about 0.2 to 0.5% by weight, on the basis of the amount of amide compound, of at least one oil-soluble antioxidizing agent selected from the group consisting of tocopherol and stearyl ascorbate;

2. adding to and melting into the melted mixture maintained at said temperature of 110° to 120°C. about 1.0 to 3.0 percent by weight, on the basis of the amount of amide compound, of at least one of said oil-soluble anti-oxidizing agents and an antioxidizing agent selected from the group consisting of butyl hydroxytoluene and butyhydroxyanisole;

3. dispersing the resulting melted mixture in an aqueous solution of a gellating agent, about 0.1 to 3.0 percent by weight, on the basis of the amount of amide compound, of at least one water-soluble anti-oxidizing agent selected from the group consisting of erythorbic acid, ascorbic acid, citric acid, the sodium salts thereof and sodium hydrogen sulfite, and at least one saccharide selected from the group consisting of sucrose, glucose and fructose or at least one sugar alcohol selected from the group consisting of sorbitol and mannitol by stirring said mixture at 70° to 85°C. until a uniform emulsion is obtained;

4. spraying the resultant emulsion, while maintained at a temperature of from 70° to 80°C., onto fine particles of a water-absorptive material which is inert and insoluble in water and has a particle size of not more than 74 microns;

5. separating the gelled beads from the fine particles of water-absorptive material, and;

6. drying the gelled beads.

15. The method according to claim 14, wherein the amount of butylhydroxytoluene or butylhydroxyanisole added to the melted mixture in step (2) is about 0.1 to 0.3 percent by weight, on the basis of the amount of amide compound.

16. A pharmaceutical preparation in the form of beads prepared by the method as claimed in claim 12.

* * * * *

UNITED STATES PATENT OFFICE
CERTIFICATE OF CORRECTION

Patent No. 3,890,433  Dated June 17, 1975

Inventor(s) Ryota Oishi et al

It is certified that error appears in the above-identified patent and that said Letters Patent are hereby corrected as shown below:

In the heading of the patent, please insert the following:

[73] Assignee:

--Sumitomo Chemical Company, Limited,
Osaka-fu, Japan --

Signed and Sealed this seventeenth Day of February 1976

[SEAL]

Attest:

RUTH C. MASON
Attesting Officer

C. MARSHALL DANN
Commissioner of Patents and Trademarks